United States Patent [19]

Reddemann et al.

[11] Patent Number: 5,027,437
[45] Date of Patent: Jul. 2, 1991

[54] SUIT FOR THE SUPPORT OF A PERSON'S BODY IN RESPECT TO ACCELERATION FORCES

[75] Inventors: Hans Reddemann; Tronje von dem Hagen, both of Lubeck, Fed. Rep. of Germany; Robin C. Huttenbach, London, Great Britain

[73] Assignee: Dragerwerk Aktiengesellschaft, Lubeck, Fed. Rep. of Germany

[21] Appl. No.: 347,744

[22] Filed: May 4, 1989

[30] Foreign Application Priority Data

Jun. 27, 1988 [GB] United Kingdom ............... 8815233

[51] Int. Cl.⁵ ................... B64D 10/00; A41D 13/00
[52] U.S. Cl. ......................... 2/81; 2/2.1 A; 2/69; 2/DIG. 3
[58] Field of Search ............... 2/81, 69, 2.1 A, DIG. 3

[56] References Cited

U.S. PATENT DOCUMENTS

| | | | |
|---|---|---|---|
| 2,228,115 | 1/1941 | Holste | 2/69 |
| 2,935,748 | 5/1960 | Sabo | 2/81 |
| 3,084,241 | 4/1963 | Carrona | 2/81 |
| 3,452,812 | 7/1969 | Betts | 2/81 |
| 3,523,301 | 8/1970 | Davis et al. | 2/2.1 A |
| 4,546,491 | 10/1985 | Beaussant | 2/2.1 A |
| 4,583,522 | 4/1986 | Aronne | 2/2.1 A |
| 4,674,479 | 6/1987 | Jennings et al. | 2/DIG. 3 |
| 4,885,930 | 12/1989 | Werner et al. | 2/2.1 A |
| 4,895,320 | 1/1990 | Armstrong | 2/2.1 A |

Primary Examiner—Werner H. Schroeder
Assistant Examiner—Gloria Hale
Attorney, Agent, or Firm—McGlew & Tuttle

[57] ABSTRACT

A suite for the support of the body in respect of acceleration forces has ducts running therethrough forming pressure bodies which are distributed among different suit areas and are filled with a pressure-generating medium, which serves at the same time as the thermal conditioning agent, which is supplied from a pressure supply unit which does not hinder the heat exchange between the body and the cooling medium so as to function as a heat suit. The comfort of wear is improved with simultaneous protection against acceleration forces and a tempering of the body by circulating a heat carrier medium which can flow through at least individual areas of the suit. The areas are connected to a heat exchanger.

5 Claims, 2 Drawing Sheets

SUIT FOR THE SUPPORT OF A PERSON'S BODY IN RESPECT TO ACCELERATION FORCES

FIELD AND BACKGROUND OF THE INVENTION

The invention relates in general to body support devices and in particular to a new and useful suit for the support of the body in respect to acceleration forces, which includes pressure bodies distributed among different suit areas and filled with a pressure-generating medium which is supplied from a pressure supply unit.

Such suits are termed pressure suits or anti-g-suits and serve to compensate the loading of the body under acceleration forces, as arise, for example, in the case of rapid changes in altitude in combat flying. By means of specific pressure exerted on the outer body surface, the blood vessel system of the body is placed under pressure. This prevents the blood volumes from dropping, under the effect of the acceleration forces, from the vital brain and upper body area into the lower extremities or arms. To this end, the suit is divided into partial areas which can be strapped around the corresponding places of the body, individually and independently, so that they lie close to these places. The individual areas are connected between themselves to a pressure circulation system which is supplied with a pressure supply unit. The pressure required in each case can be generated in the circulation or even be reduced again by the pressure supply unit. The individual areas of the suit can then either be connected to a common circulation system or individual areas can have their own independent pressure supply circulation system.

Such a suit has been described in U.S. Pat. No. 2,495,316.

The known suits are used for flying personnel, above all for jet pilots, who are subject to large acceleration forces during their flights, especially if, for example, they execute tight curvilinear flights. In order to prevent, for example, the blood plasma from flowing off into the lower extremities in the case of a curvilinear flight, an excess pressure is introduced into the sleeves around the lower legs and upper thighs, as well as into the arm region if necessary. As soon as the acceleration forces subside, the pressure in the respective partial areas is reduced again.

In addition to the body loading through acceleration forces, the pilots are also subjected to intense influences of temperature through direct solarization into the cockpit, thus loading the circulation further. In order to eliminate this loading, suitable temperature conditioning suits are put on. They include flexible tubes which are arranged in a spiral or meander-shaped way and which are sewn into the woven fabric of the suit on the inside and must lie close to the body surface in order to guarantee temperature conditioning through heat conduction. In a coolant circulation system including a heat exchanger, a pump and flexible tube system, a fluid working medium transports the heat away from the body or to the body. (German Offenlegungsschrift 16 10 647)

If the loading of the body through acceleration forces and temperature fluctuations is to be prevented, it is necessary in the case of the conventional suit systems to put on two separate suits, one upon the other. As a rule, the suit lying inside is then the heat protection suit and the outer suit is the anti-g-suit. The outer anti-g-suit can then only transmit the pressure effect to the body surface indirectly by way of the cooling suit. In the case of bad coordination of the pressure effect of the anti-g-suit in relation to the heat protection suit lying underneath, jamming, or at least, constriction of cooling tubes can result which would reduce the efficiency of the pressure applied by an anti-g-garment. Moreover, the application of two separate suit systems is cumbersome for the mobility of the wearer and the plurality of supply connections and lines restrict this movement further. With a reversed order of suits, i.e. first the anti-g-suit and the heat protection suit lying on top, the protection against acceleration forces would increase, yet the tempering efficiency of the heat protection suit would be reduced as direct heat transmission is not possible.

SUMMARY OF THE INVENTION

The invention provides a pressure protection suit such that it does not hinder the heat exchange between the body and the cooling medium. At the same time the comfort of the wearer is improved when protection against acceleration forces and a tempering of the body are achieved.

The invention provides that the pressure generating medium be developed as a heat carrier and that the medium, which may be a liquid, flows through at least individual areas of the suit and said areas are connected to a heat exchanger.

The advantages achieved through the invention can essentially be seen in the fact that now both functions, namely the temperature conditioning and the protection of the body from acceleration forces which arise, are combined in a single suit and can be coordinated with each other in an ideal way. Two suits no longer need to be put on one on top of the other, thus hindering the freedom of movement of the wearer of the suit, and the supply connections for the pressure generation and the flow of the heat exchange medium can be the same. Moreover, when using a fluid as a flowing medium and liquid pressure-generating means, improved utilization of the pressure energy is possible as the fluid is less compressible than a gas.

Alternatively, individual or even all areas of the suit can be connected to a heat exchanger. It can be sufficient to temperature condition the upper body, and for excess pressure to act merely upon the stomach area and the extremities.

In order to facilitate a pressure effect directed radially on the body, it is advantageous to equip the areas with a wall which, on the inner surface of the suit, comprises at least in part, of an elastic material and, on the outer surface of the suit, comprises an inelastic material. When generating a pressure in the individual areas an external inflation or expansion of the individual areas or flexible tube lines does not then result, this inflation or expansion would lead to additional stiffening of the whole suit system. On the contrary, the pressure effect is directed at a restricted inner surface of the suit so that no otherwise significant cross-sectional change in the areas result.

The areas, such as sleeves, are fixed in a coverall and when first put on are adjusted to the periphery of the respective body part. The suit is thus tailored to the physical characteristics of the wearer. Several suit areas can be combined, in terms of flow, by way of the connection pieces, so that a common connection to a conveying unit for conveying a medium can be provided. Individual areas can also be connected separately, with their connection pieces, going to the conveying unit by way of the heat exchanger.

For purposes of directing the medium throughout the areas, the sleeves are provided with ducts, which are connected with one another by through-passages. Connection pieces connect individual areas.

Located in the connection pieces themselves there can be constrictions, by means of which the cross-sections of the connection pieces can be varied. These constrictions form a pressure differential from one side of the constriction to the other. In the flow direction this appears as a pressure drop. The individual areas connected in sequence by the connection pieces form a series of pressure drops, giving each area a different pressure. According to the requirement, it can also be desirable to exclude a certain partial area from pressure by completely closing the corresponding constriction. The constrictions can also be activated by a control device which opens or closes the constrictions in a manner dependent upon pressure, in a preselectable way. As a result the suit can, for example, either be used purely as protection from large accelerations, if the final constrictions in the direction of the flow, are closed and the others are open, or as a pressure-heat-suit if all the constrictions are fully open.

Accordingly, it is an object of the invention to provide a suit for the support of the human body which comprises a coverall body having an upper body area with respective first and second arm portions, an abdominal area connected to the upper body area and respective upper and lower leg areas connected to the abdominal area, each area having a circulating tube therein for applying a pressure medium which is circulated by a pump which also connects to a heat exchanger to provide a selected temperature of circulated media.

A further object of the invention is to provide a suit which has ducts circulating media therethrough and which includes a fabric material having an interior covering over an elastic pressure complying covering and an outer material of an inelastic pressure-proof woven fabric layer.

A further object of the invention is to provide a pressure suit which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
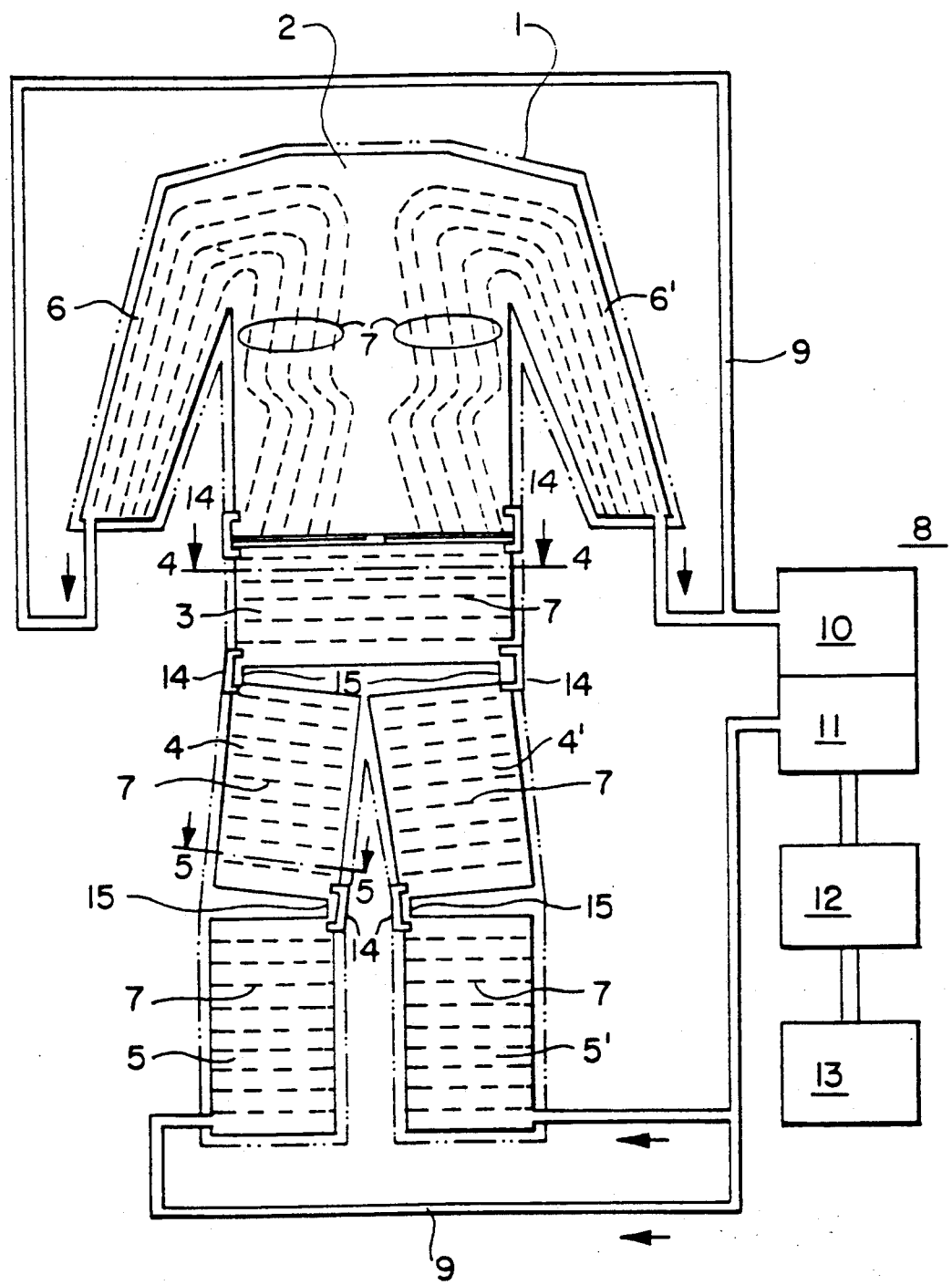
FIG. 1 is a schematic elevational view of a suit having partial areas through which a medium is circulated by ducts arranged in these areas in accordance with the invention.

Referring to the drawings in particular, the invention embodied therein in FIG. 1 comprises a suit in the form of a coverall 1 which has various areas into which it is subdivided and which are interconnected by ducts 7 to provide a selected circulation of media through the ducts 7 to effect pressure points and temperature control points in the suit.

In FIG. 1 there is represented a suit 1 which is tailored in the form of a coverall, from a flexible, non-expandable woven fabric. The suit 1 is divided into several partial areas, of which the largest is an upper body area 2 to which there connects an abdominal area 3, upper thigh areas 4 and 4' and lower leg areas 5 and 5'. Arm areas 6 and 6' form with the upper body area 2, a unit. Each of the partial areas has a network of ducts 7 running through it. The network of ducts in the arm areas 6 and 6', at the positions of the sleeve openings, and in the lower leg areas 5 and 5', at the positions of the feet openings, are connected to a supply unit or system generally designated 8 by way of supply lines 9.

The supply unit 8 contains a conveying unit 10 and a heat exchanger 11, connected to a pressure supply unit 12 generating the medium pressure and to a media supply 13. Each of the partial areas 2, 3, 4, 4', 5, 5', 6, 6' are connected with the other by way of connection pieces 14 in which a constriction 15 is incorporated.

The convey unit 10 is responsible for removing the medium through the suit 1. Before the medium enters the suit 1 heat is added or removed according to the needs of the wearer by the heat exchanger 11. The pressure of the medium is controlled by the pressure supply unit 12, shown in the preferred embodiment as working through the heat exchanger 11. However, the exact position of the pressure supply unit is arbitrary. The fact that the suit expands and contracts during operation necessitates the need for the media supply to alleviate any shortage or excess of media.

The ducts 7, drawn in broken lines, are each connected one after the other, in terms of flow, according to area, and the individual areas are united by the connection pieces 14. The preferred direction of the flow is for entry of the medium at the lower legs 5, 5' and exit in the arm area 6, 6'.

Figure 2:
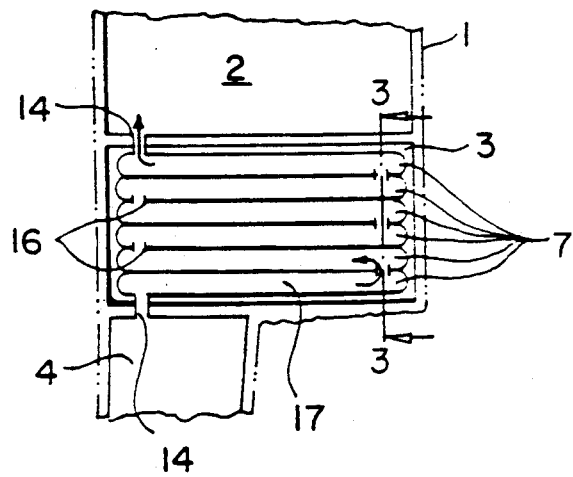
FIG. 2 is a diagrammatic view of the abdomen area.

A diagrammatic inner view for the abdominal area 3 is represented in FIG. 2. The individual ducts 7 are connected with each other by way of the through-passage 16 and start at the connection piece 14 of the upper thigh area 4 and end at the further connection piece 14 leading to the upper body area 1. The flow direction of the medium 17, which transmits the pressure and the heat, is represented by means of flow arrows.

The constrictions 15 cause pressure drops between areas, and to a lesser extent, the through passages cause pressure drops between ducts. The preferred flow being from the bottom of the lower legs 5, 5' causes each area after the lower legs 5, 5', namely 4, 4', 3 and 6 to have successively lower pressures. This is the preferred manner if the acceleration is in the direction of the feet upwards, because it restricts the lower extremities the most, where most of the blood volume would collect. Of course the direction of the flow and the placement of the connection pieces can be modified in situations where accelerations are in a different direction.

The amount that the cross section of the constrictions can be varied by a control device (not shown). The control device could vary the constrictions 15 in response to varying magnitudes and directions of accelerations, and to changes in temperature.

Figure 3:
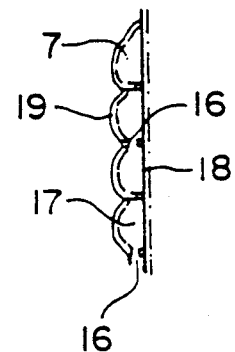
FIG. 3 is a section taken along the line C—C of FIG. 2.

The section C—C represented in FIG. 3 shows the bead-shaped development of the ducts 7 filled with the medium 17. The inside of the suit 1 is equipped at this point with an expandable and flexible covering 18 furthering the heat transmission. The surface of the suit pointing to the environment is equipped with a flexible, non-expandable and pressure-proof woven fabric layer 19.

Figure 4:
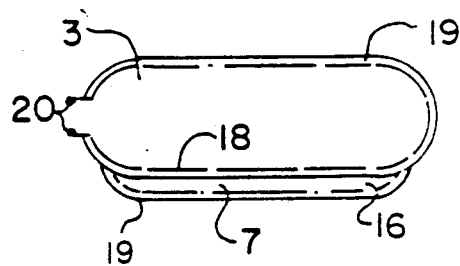
FIG. 4 is a section taken along the line A—A of FIG. 1.

The section A—A represented in FIG. 4 shows the sleeve-shaped abdominal area 3 which can be stretched by way of a sleeve seal 20 around the abdomen of the wearer of the suit. The outer pressure-proof woven fabric layer 19 surrounds the total sleeve 3. The pressure-compliant elastic covering 18 is located on the inner surface of the suit 1 facing the stomach area of the wearer of the suit. This area is provided with the ducts 7, as a pressure effect. On the inflexible back area of the wearer of the suit the pressure effect is not as important. Nevertheless, the whole back area also has ducts 7 running through it in order to guarantee a heat exchange.

Figure 5:
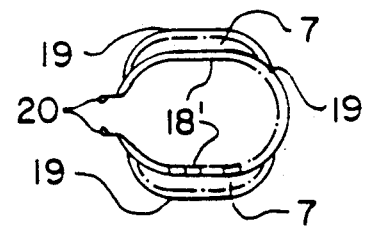
FIG. 5 is a section taken along the line B—B of FIG. 1.

In FIG. 5 the section B—B shows an upper thigh sleeve about the partial area 4. Here front and rear sides of the sleeve are provided with ducts 7. The side of the sleeve facing the body part is provided with the pressure-compliant covering 18 and the outer cover comprises the pressure-proof woven fabric layer 19.

While specific embodiments of the invention have been shown and described in detail to illustrate the application of the principles of the invention, it will be understood that the invention may be embodied otherwise without departing from such principles.

What is claimed is:

1. An anti-gravity suit for applying different pressures to different parts of the human body to counteract the effects of acceleration forces, comprising a coverall body having an upper body area with respective first and second area portions secured to said upper body area on respective sides thereof, said upper body area having a lower end, an abdominal area connected to said lower end of said upper body area, said abdominal area having a lower portion, respective upper and lower leg areas connected to said lower portion of said abdominal area on each side thereof, each of said areas having ducts extending therethrough and said ducts being interconnected, supply means for supplying liquid medium to said ducts and for withdrawing said liquid, a heat exchanger connected to said supply means, said liquid being flowable through at least individual area of said suit, thereby applying pressures at least to areas other than said upper body areas, such other areas being connected to said heat exchanger, the liquid thus serving both as a pressure generating medium and a thermal conditioning agent.

2. An anti-gravity suit according to claim 1, wherein said areas have an interior wall comprising at least part of an elastic pressure-compliant covering, an outer surface which comprises at least in part an inelastic pressure proof woven fabric layer.

3. An anti-gravity suit according to claim 2, wherein said areas can be wrapped, around the parts of the body to be supported, in a sleeve-like manner and can be connected with each other by flow connection pieces and including a link-type connection piece interconnecting said areas.

4. An anti-gravity suit according to claim 1, wherein said ducts are connected with one another by a through-passage and open into said connection pieces.

5. An anti-gravity suit according to claim 4, wherein said connection pieces have flow cross-sections which can be varied to form constrictions depending on pressure arising from acceleration effects.

* * * * *